May 17, 1955     C. U. GRAMELSPACHER     2,708,470

TIRE CONSTRUCTION

Filed Feb. 20, 1952     2 Sheets-Sheet 1

INVENTOR
CLARENCE U. GRAMELSPACHER
BY Toulmin & Toulmin
ATTORNEYS

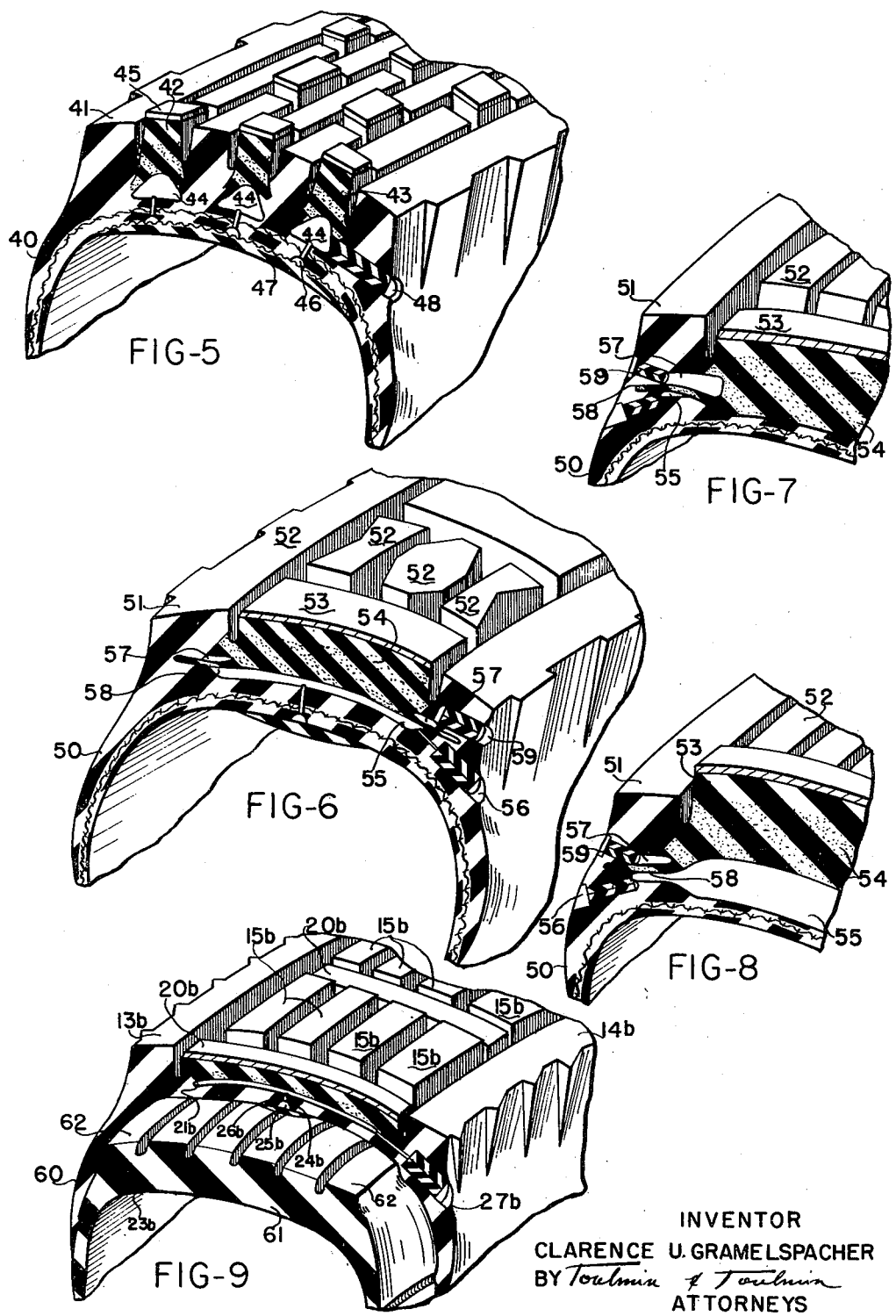

United States Patent Office 2,708,470
Patented May 17, 1955

2,708,470

TIRE CONSTRUCTION

Clarence U. Gramelspacher, Jasper, Ind.

Application February 20, 1952, Serial No. 272,605

5 Claims. (Cl. 152—208)

This invention relates to inflatable tires that are particularly adaptable for use on passenger vehicles and trucks. There are a number of tires for passenger vehicles and trucks on the market today that have special treads for use in snow and mud and on ice, but once these special tires are placed on a vehicle they must be in use continuously. It is well recognized that tire treads adapted for gripping action in deep snow and mud are extremely noisy in running on dry road. Also, the mileage obtained from such tires is greatly reduced from that obtained with normal treads adapted for dry road use because of the excessive abrasion that occurs on the lugs of these so-called "snow tires" when operating on dry road.

It is, therefore, an object of this invention to provide a casing section of a tire for a passenger vehicle or truck that has a tread adapted for "fair weather" use and which can be quickly changed to a tread specifically adapted for "foul weather" use, such as in deep snow and mud, and wherein the tread is also adaptable to use on ice with extra friction surface provided for this latter use.

In the applicant's invention such an interchangeable tread arrangement is obtained by providing movable members on a casing section that can be projected beyond the normal tread of the casing section to provide gripping lugs, and can be retracted below the normal tread of a casing section so that the tire will run on the normal "fair weather" tread with the lugs out of contact with the road surface. If desired, the projectable lugs or movable members can have their peripheral surface at tread level and be a part of the normal tread design of the tire casing, the movable members being projectable beyond the level of the tread when desired. This arrangement provides for a wearing down of the projectable lugs to the level of the tread in accordance with the wear on the tread. In this instance, with the projectable lugs or movable members forming a continuous part of the tread design, the complete tread of the tire including the movable members, is usable as the "fair weather" tread.

In accomplishing the objects of this invention, the movable members on the casing section of the tire are formed as an integral part of the tire but with expansible air chambers in the tire casing below the movable members so that expansion of the air chambers will cause the movable tread sections to project beyond the normal tread level. When the air chambers are deflated the projectable tread sections or movable members will return to normal tread level or be retracted below tread level.

In accomplishing these and the foregoing objects, the invention includes the use of elastic portions in the casing of the tire by which the movable members or movable tread sections are attached to the casing so that compression of the elastic portions will cause projection of the movable members beyond tread level. The elastic portions of the tire casing can be made of sponge rubber, for example.

Also, it is within the purview of this invention to construct the tire casing section having the movable members or tread sections on it as a complete tire or as a casing section that can be removably attached to a standard tire, the latter being occasioned by constructing the casing section in semi-elliptical transverse cross-section for placement upon a tire while it is in a deflated condition and upon inflation of the tire, retaining the removable casing section in friction engagement with the standard tire.

Further objects and advantages will become apparent from the drawings and the following description.

In the drawings:

Figure 5 is a transverse cross-sectional perspective view of a modified arrangement of a tire construction incorporating features of this invention;

Figure 6 is a transverse cross-sectional view of another modified construction of a tire incorporating features of this invention, wherein independent air chambers are used to project and retract the movable members of the casing;

Figure 7 is a transverse cross-sectional view of the tire casing of Figure 6, illustrating the movable members of the tire tread in retracted position;

Figure 8 is a transverse cross-sectional view of the tire structure of Figure 6, illustrating the movable members in projected position; and, Figure 9 is a transverse cross-sectional perspective view of a tire casing section utilizing the construction of the casing section of Figure 1, but adapted for removable attachment upon a standard tire.

Figure 1:
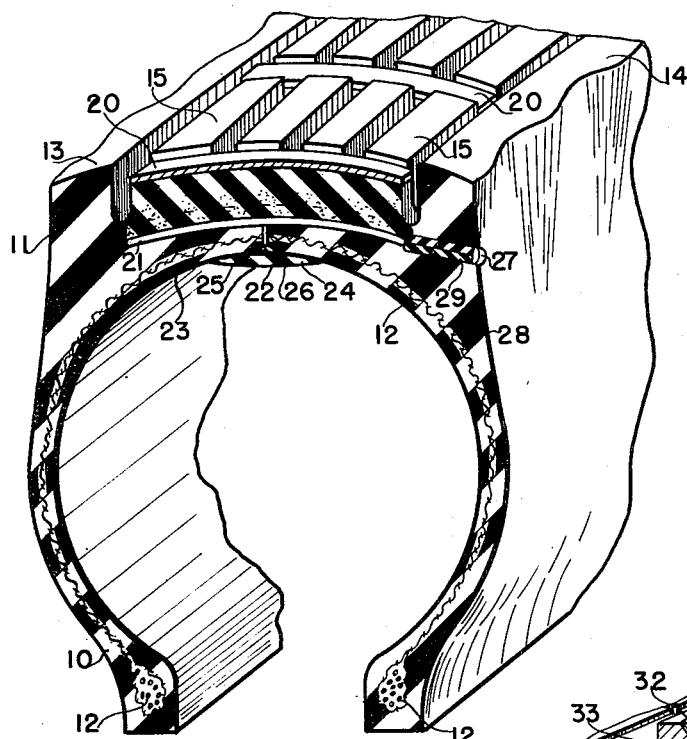
Figure 1 is a transverse cross-sectional perspective view of a tire casing incorporating features of this invention.

Referring to Figure 1, the construction of the tire casing 10 can be according to standard practice, whereas, the tread section 11 is especially constructed to incorporate the features of this invention.

The tire casing 10 consists of the usual fabric layers 12 onto which the tread section 11 is applied.

The tread section 11 may consist of the outer ribs 13 and 14 and a plurality of inner ribs 15, all extending longitudinally around the tire. The rib design is not a feature of this invention as the invention can be applied to any tread design desired.

Spaced periodically around the periphery of the tire is a plurality of movable members 20 that are adapted to be projected beyond the level of the tread ribs 13 and 15, thus providing for transverse ribs across the tread that form lugs extending above the level of the tread to obtain extra gripping action of the tread in deep snow and mud.

The movable members or lugs 20 may be formed from an elastic material, preferably rubber or rubber-like material, which is bonded to the tread ribs 15 as well as to the casing 10. For example, the movable members or lugs 20 can be constructed of sponge rubber, either wholly or in part. For example, the upper portion of the lugs 20 can be constructed of the same material as the tread rubber 15 with the lower portion of the lugs being made of sponge rubber or other more elastic rubber than that of the tread rubber. In this latter event, the wearing surface of the lugs 20 will be equal to that of the tread rubber 15 and the elastic portion will provide for projection of the lug beyond the level of the tread ribs 13 and 15.

Figures 2, 3:
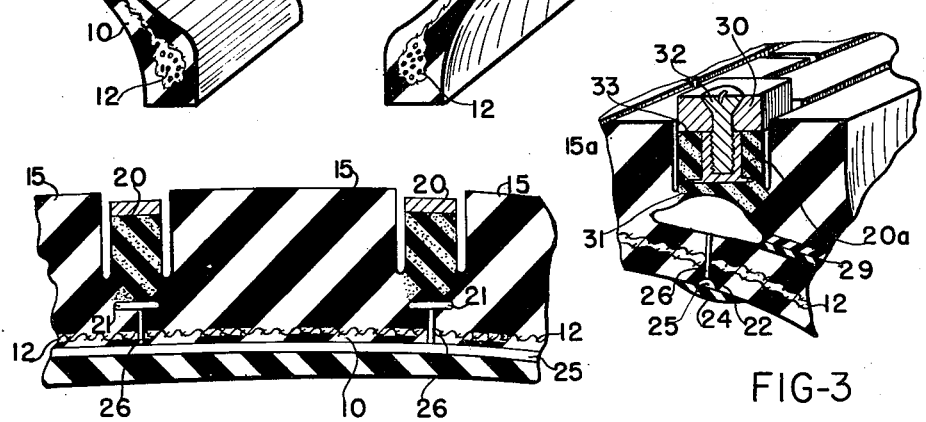
Figure 2 is a vertical cross-sectional view of Figure 1.
Figure 3 is a cross-sectional view through a movable member of the tire casing, illustrating the manner of providing for removable attachment of friction plates onto the movable member of the tire casing.

As illustrated in Figures 1 and 2, the upper surface of the lugs 20 are positioned below the level of the tread ribs 13 and 15 to eliminate engagement of the lugs 20 from the road surface during "fair weather" driving. If desired, however, the upper surface of the lugs 20 can have their normal position at tread level so as the tread level wears, the level of the lugs 20 will wear correspondingly and a uniform tread level is obtained throughout the periphery of the tire.

The lugs 20 are projectable beyond the level of the tread ribs 13 and 15 by means of expansible air chambers 21 that are positioned in the casing 10 beneath each of the lugs 20. When air pressure is applied to the air chambers 21, the elastic rubber in the lugs 20 will be compressed, forcing the lugs upwardly relative to the tread level and project the same beyond tread level. To provide for a minimum of chambering in casing, each of the air chambers 21 is an independent chamber positioned only immediately below the lug it is to operate. Thus, that portion of the tire between the transverse lugs 20 is of standard construction with the tread bonded firmly to the casing.

To supply air pressure to each of the chambers 21 spaced around the periphery of the tire, an annular recess 22 is provided on the inner periphery 23 of the casing 10. The recess 22 is covered with an inner liner member 24, thereby forming a passage 25. The passage 25 extends annularly around the periphery of the tire so that feed passages 26 may supply each of the chambers 21.

To provide for inflation and deflation of the air chambers 21, a self-sealing valve 27 is provided in the side wall 28 of the casing and is connected by a passage 29 with any one of the passages 21, whereby air flow will be through the passage 21, connecting passage 26 and into the distributing passage 25. The self-sealing valve 27 may be of the conventional type in which a needle is inserted through the self-sealing valve for entry into the passage 29. Upon withdrawal of the needle from the self-sealing valve 27 the valve closes. Such valves are conventionally used on footballs, basketballs and other inflatable equipment. To deflate the air chambers 21, a bleed needle can be inserted through the valve 27.

In Figure 3 there is illustrated an arrangement by which specially hardened lugs 30 can be attached to the projectable lugs 20a. In this arrangement a metal insert 31 is molded into the lug 20a and the member 30 is attached to the projectable lug 20a by means of a screw fastener 32. The removable members 30 can be hardened metal plates that act as the cross members of a chain, or they can be hard rubber members which act as lugs for use in deep snow and mud. The line of separation 33 between the lug 30 and the projectable lug 20a is preferably below the level of the tread ribs 15a so that the lugs will bear against tread rubber and thus provide for more substantial retention of the removable lugs 30 onto the projectable lugs 20a.

Figure 4:
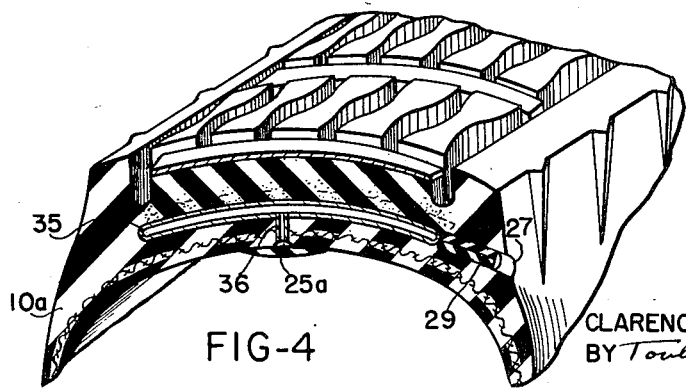
Figure 4 is a transverse cross-sectional view of a modified structure of the device of Figure 1, illustrating a particular method of placing air chambers within the tire casing.

In Figure 4 there is illustrated a structure in which the chambers 21 are created within the casing 10 by placement of thin elastic sleeves 35 within the casing during build up of the casing. These sleeves are suitably closed at their ends to provide chambers, and the inner surface of the sleeves can be treated to prevent vulcanization of these surfaces when vulcanizing the complete tire. Each of the sleeves 35 can be provided with a thimble 36 that connects the sleeve with the recess 25a in the casing 10a.

In Figure 5 there is illustrated a modified arrangement of tire construction, wherein the casing 40 is provided with a tread structure 41. Within the tread structure 41 and aligned with the tread design are independent projectable lugs 42 that are secured to the tread and to the casing by the elastic portions 43. An air chamber 44 is located in the casing in vertical alignment with each of the projectable lugs 42. Expansion of the air chamber 44 causes the lugs 42 to project beyond the tread level for the purposes heretofore described. The tops or caps 45 of the lugs 42 may be hardened steel plates or be in the form of removable lugs in the manner illustrated in Figure 3.

The independent air chambers 44 are supplied with air under pressure from the passage 46 provided in the inner periphery of the casing 40 in the manner described with reference to Figure 1.

The inner liner 47 may extend completely across the inner periphery of the tire to form the passages 46, and may include as a part of its construction an elastic material for self-sealing of punctures.

A self-sealing valve 48 is provided through which air is supplied to the air chambers 44 or bled therefrom in the manner heretofore described.

In Figures 6, 7 and 8 there is illustrated another modified form of the invention that consists of the tire casing 50 and a tread portion 51 consisting of the usual tread ribs 52. The movable members 53 can be of the form illustrated in Figure 1 or of the form illustrated in Figure 5, and are attached to the tire casing by the elastic portion 54.

In the form of the invention illustrated in Figures 6 to 8 an air chamber 55 is provided beneath the movable members 53, which upon expansion, as illustrated in Figure 8, projects the movable members 53 above the level of the tread ribs 52. This air chamber is provided with a self-sealing valve 56 through which air is supplied to the chamber or bled therefrom.

A separate air chamber 57 is provided in the casing 50 and is separated from the lower air chamber by an elastic diaphragm 58. The air chamber means 57 is connected with a self-sealing valve 59 through which air is supplied to the chamber means 57 or bled therefrom. When air is supplied through valve 56, air is bled through valve 59 to permit projection of the lugs 53 above the level of the tread ribs 52. When the movable members or lugs 53 are to be brought down to the level of the tread ribs 52 or retracted below the level of the tread ribs, the air chamber 55 is bled through the valve 56 and air is supplied to the chamber means 57 through the valve 59, thus expanding the air chamber means 57, as illustrated in Figure 7, to securely lock the movable members 53 in their retracted position.

In Figure 9 there is illustrated a modified arrangement of the invention by which the casing section is constructed in the form of a removable structure that can be placed upon a standard tire or removed therefrom at the will of the operator. In this form of the invention the casing section 60 has its transverse cross-section constructed in the form of a partial circle and adapted to fit over the exterior of a standard tire 61 having a regular tread 62. The casing section 60 is placed upon the tire 61 by deflating the tire so that the casing section 60 can be placed around the tire 61. Thereafter, the tire 61 is inflated in normal manner with the casing section 60 held securely in place on the outer periphery of the tire 61.

The construction of the casing section 60 as to the movable elements or movable lugs that are projectable beyond the tread surface may be in accordance with any of the illustrations shown in the drawings, but as specifically illustrated follows the construction of the device as shown in Figure 1. Thus, the numerals of the device of Figure 9 correspond to the numerals of like elements of the device shown in Figure 1 with the exception that the letter (b) is added as a suffix to the numerals. The operation of the casing section 60 is exactly like that of the device illustrated in Figure 1.

While the apparatus disclosed and described herein constitutes preferred forms of the invention, yet it will be understood that other forms of the invention can be produced without departing from the principle of the

I claim:

1. An automotive tire comprising a unitary casing, said casing comprising a main tread portion of resilient rubber-like material, circumferentially spaced recesses in said tread portion, blocks of rubber-like material of greater resiliency than the material of the said tread portion disposed in said recesses and joined to said tread portion about their peripheries at least at the bottoms of said recesses, means normally holding said blocks so that their outer road engaging surfaces are disposed inwardly of the outer surface of said main tread portion, and inflatable chamber means associated with each said block adapted for receiving fluid pressure for moving said blocks outwardly so that they project beyond said tread portion into road engaging position, said inflatable chamber means extending substantially the entire lateral and circumferential extent of said blocks, and the means for urging said blocks inwardly comprising relatively small inflatable chamber means in said casing disposed adjacent the ends of said blocks.

2. An automotive tire comprising a unitary casing having a tread portion of resilient rubber-like material, circumferentially spaced recesses in said tread portion, blocks of resilient rubber-like material disposed in said recesses and joined to said tread portion at the bottoms of said recesses, chamber means formed in said casing radially inwardly of said blocks and receiving fluid under pressure to project the blocks radially outwardly, and means for locking said blocks in retracted position so that their outer road engaging surfaces are disposed inwardly of the outer surface of said tread.

3. An automotive tire as claimed in claim 2, with said locking means being associated with the transverse ends of said blocks.

4. An automotive tire comprising a unitary casing having a tread portion of resilient rubber-like material, said tread portion having circumferentially spaced movable portions therein, chamber means in said casing radially inwardly of said movable portions for receiving fluid under pressure to project said movable portions radially outwardly, and means for locking said movable portions in retracted position so that their outer road engaging surfaces are disposed inwardly of the outer surface of said tread.

5. An automotive tire as claimed in claim 4, with said locking means comprising inflatable chamber means.

References Cited in the file of this patent

UNITED STATES PATENTS

| | | |
|---|---|---|
| 1,067,563 | Wagner | July 15, 1913 |
| 1,398,975 | Renos | Dec. 6, 1921 |
| 2,217,122 | Lowry | Oct. 8, 1940 |
| 2,480,548 | Carhart | Aug. 30, 1949 |
| 2,491,491 | Freygang | Dec. 20, 1949 |
| 2,672,908 | Donegan | Mar. 23, 1954 |

FOREIGN PATENTS

| | | |
|---|---|---|
| 971,455 | France | Jan. 17, 1951 |